United States Patent [19]
Morris et al.

[11] Patent Number: 4,654,134
[45] Date of Patent: Mar. 31, 1987

[54] COMBINATION SEAL AND TENTERING MEANS FOR ELECTROLYSIS CELLS

[75] Inventors: Gregory J. E. Morris, Lake Jackson; Sandor Grosshandler, Houston, both of Tex.

[73] Assignee: The Dow Chemical Company, Midland, Mich.

[21] Appl. No.: 761,924

[22] Filed: Aug. 2, 1985

[51] Int. Cl.⁴ .......................... C25B 13/02; C25B 9/00
[52] U.S. Cl. .................................... 204/252; 204/253; 204/279; 204/267
[58] Field of Search ....................... 204/279, 253–258, 204/267

[56] References Cited

U.S. PATENT DOCUMENTS

| | | | |
|---|---|---|---|
| 2,306,160 | 12/1942 | Freyssinet | 288/6 |
| 4,026,782 | 5/1977 | Bouy et al. | 204/254 |
| 4,076,609 | 2/1978 | Mas | 204/258 |
| 4,139,448 | 2/1979 | Wallace | 204/256 |
| 4,175,025 | 11/1979 | Creamer et al. | 204/253 |
| 4,207,165 | 6/1980 | Mose et al. | 204/258 |
| 4,313,812 | 2/1982 | Kircher | 204/253 |
| 4,342,460 | 8/1982 | Eng | 204/279 X |
| 4,344,633 | 8/1982 | Niksa | 277/228 |
| 4,431,502 | 1/1984 | Ford | 204/279 X |
| 4,470,608 | 9/1984 | Warren | 277/164 |
| 4,493,759 | 1/1985 | Boulton et al. | 204/279 X |

FOREIGN PATENT DOCUMENTS 58-35272  8/1986  Japan .

Primary Examiner—Donald R. Valentine
Attorney, Agent, or Firm—Joe R. Prieto

[57] ABSTRACT

A combination seal and tentering means for an electrolysis cell comprising a substantially solid member interposed between at least one side of a separator of the cell and at least one electrode frame member of the cell. The substantially solid member has a first generally planar surface in contact with one side of the separator of the cell and a second uneven surface in contact with the electrode frame of the cell and a periphery defining a shoulder portion having an inside in contact with the outside surface of the electrode frame member.

38 Claims, 8 Drawing Figures

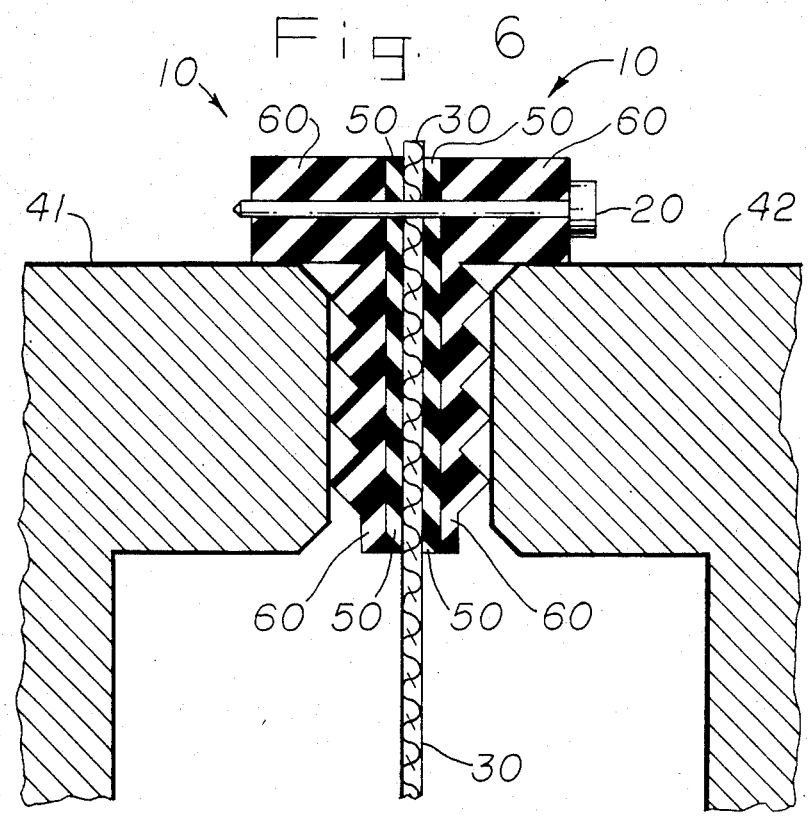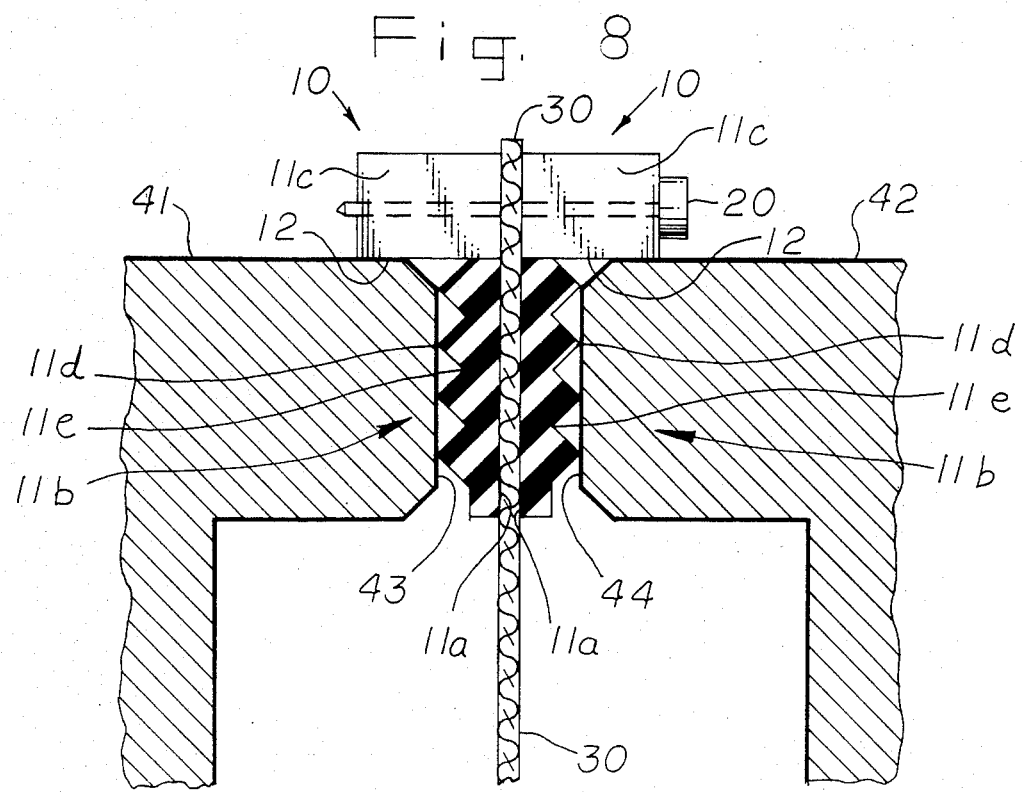

COMBINATION SEAL AND TENTERING MEANS FOR ELECTROLYSIS CELLS

BACKGROUND OF THE INVENTION

This invention relates to a combination seal and tentering means for an electrolysis cell.

Membrane-type electrolysis cells, i.e., electrolysis cells employing membranes interposed between a pair of adjacent electrode frames, typically use a separate and independent seal means, for example, a gasket, interposed between the membrane and an electrode frame member to provide a gas and electrolyte tight seal for the cell.

In addition to a seal means, membrane type electrolysis cells typically use a separate and independent tentering device to planarly dispose the membrane between at least two flat surface, parallel flanges of opposing anodes and cathodes. There are several problems associated with a non-planar membrane, or a wrinkled membrane, installed between electrode frames of an electrolysis cell during operation of the cell. For example, a wrinkled membrane can reduce the circulation of electrolyte or can trap gas bubbles between the electrode and the membrane face, resulting in a nonuniform increase of the resistivity of the electrolyte solution in ther interelectrode space with the nonuniform current distribution in the vertical direction. This leads to an increase in current consumption and relatively higher costs in operating a cell. This can also cause leaks in the membrane which can damage the external structure of the cell and loss of cell efficieny.

The method of tentering the membranes and sealing the membrane-type cells becomes increasingly important in flat plate-type or filter press-type electrolysis cells where several repeating units of membranes and electrode frames are used. Conventional methods for tentering the membrane and sealing the cell have included using a separate gasket and tentering device. One method of tentering the membrane involves holding the membrane by hand between cell frames and stretching the membrane as the cell frames are compressed together. The cell gaskets in this instance are glued to one of the electrode frames. In another method, the cell frames, membranes and gaskets are assembled in the horizontal position to ensure a planar placement of the membrane and gaskets, and thereafter standing the assembled cell in the upright position for operation. Still another method, the membrane and gasket are glued to the cathode or anode frame prior to assembling the elements of the cell together.

The above approaches are unsatisfactory as they present time consuming, complex procedures, costly equipment and safety hazards to personnel. It is desired to provide a means suitable for sealing an electrolysis cell and tentering an electrolysis separator to reduce the complexity of assembling the elements of an electrolysis cell.

SUMMARY OF THE INVENTION

One aspect of the present invention is directed to a combination seal and tentering means for an electrolytic cell. The combination seal and tentering means is a substantially solid member adapted to be interposed between at least one side of a separator of an electrolysis cell and at least one electrode frame member of the cell. The substantially solid member has a first planar surface adapted to contact at least one side of the separator, a second uneven surface adapted to contact the electrode frame member, and a periphery defining a shoulder portion having an inside surface in contact with the outside surface of the electrode frame member.

Another aspect of the present invention is a combination seal and tentering assembly for an electrolysis cell including (a) a first seal-tentering means adapted to contact one side of a separator and of the cell at least one electrode frame member of the cell, said first seal and tentering means comprising a substantially solid member having a first generally planar surface adapted to contact the separator, a second uneven surface adapted to contact at least one electrode frame member and a periphery defining a shoulder portion having an inside surface adapted to contact the outside surface of at least one electrode frame member, (b) a second seal-tentering means adapted to contact the other side of the separator and the other electrode frame member of the cell, said second seal-tentering means comprising a substantially solid member having a first generally planar surface adapted to contact the separator, a second uneven surface adapted to contact at least the other electrode frame member and a periphery defining a shoulder portion having an inside surface adapted to contact the outside surface of at least the other electrode frame member, and (c) a fastener means adapted to secure the first seal-tentering means and the second seal-tentering means together.

Still another aspect of the present invention is an electrolysis cell assembly including the combination seal and tentering means above.

Yet another aspect of the present invention is a method of sealing and tentering in an electrolysis cell using the combination seal and tentering means above.

BRIEF DESCRIPTION OF THE DRAWINGS

The invention can be better understood by reference to the drawings illustrating the preferred embodiments of the invention. The same numerical designation is used in all the Figures where identical elements are shown.

FIG. 6 is a cross-sectional view of another embodiment of the present invention showing an electrolysis cell assembly with a combination seal and tentering means.

FIG. 8 is a cross-sectional view of the portion of an electrolysis cell assembly of FIG. 7 showing a combination seal and tentering means positioned between two adjacent cell frames.

DETAILED DESCRIPTION OF PREFERRED EMBODIMENT

A seal and tentering assembly is shown in FIGS. 1–8. The assembly includes a pair of combination seal and tentering means, herein referred to as "seal-tentering means", and generally indicated by numeral 10. The assembly also includes a fastener means, for example, a pin member 20. The seal and tentering assembly is used with an electrolysis cell assembly employing a separator 30. The seal and tentering assembly according to the present invention is particularly useful for electrolysis cells employing a separator, for example, chlor-alkali cells used for the production of chlorine and an alkali metal hydroxide and, therefore, the present invention will be described with reference to electrolytic cells employing a separator. Suitably used are electrolysis cells of the flat plate-type or filter press-type. More preferably, the present invention will be described herein with reference to filter press-type electrolysis cells which may be monopolar or bipolar. Filter press-type cells are described, for example, in U.S. Pat. Nos. 4,108,742 and 4,111,779.

Figure 1:
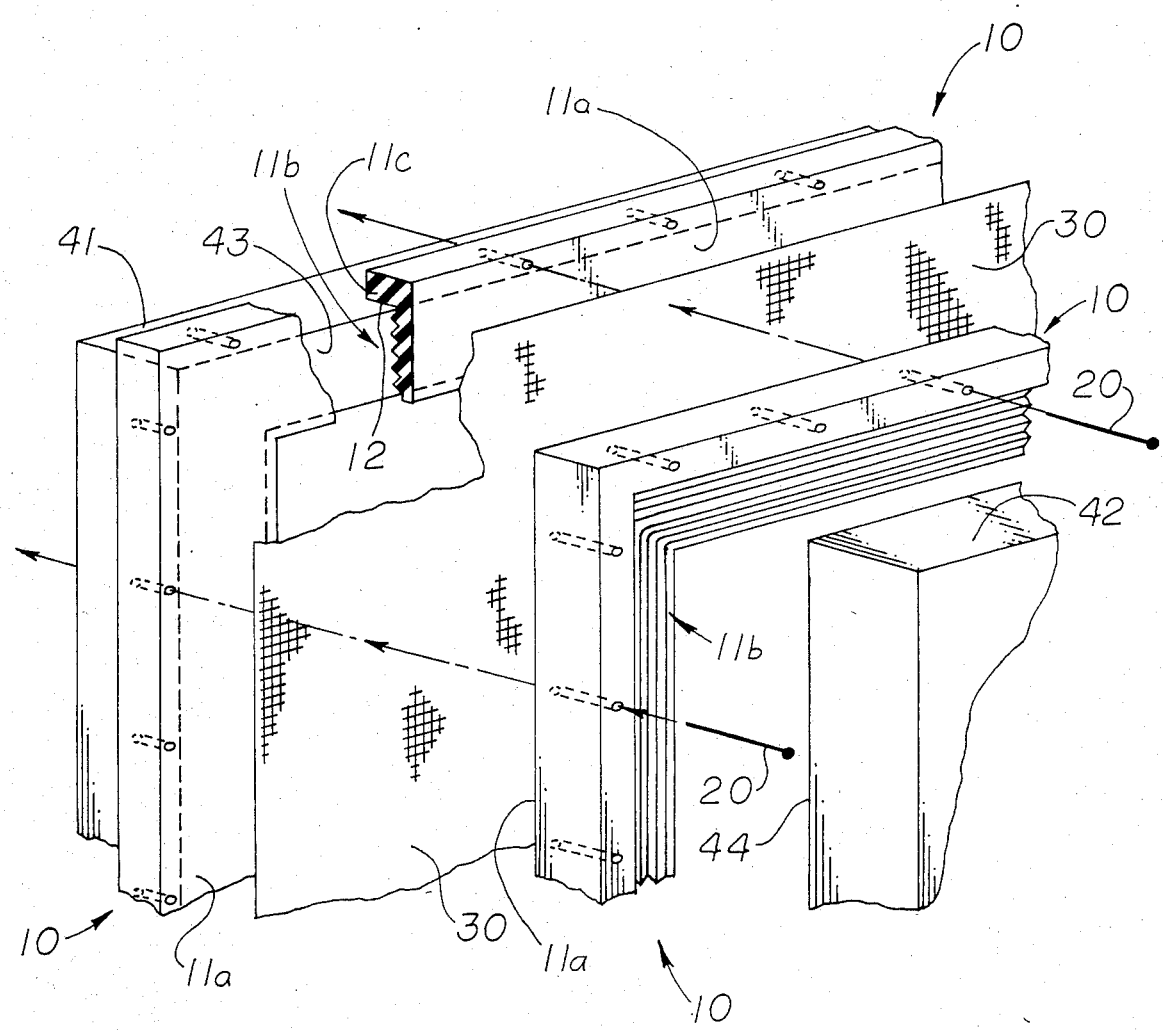
FIG. 1 is a partially cut away, partially exploded, perspective view of a corner portion of an electrolysis cell assembly showing adjacent filter press-type cell frames, a membrane and a combination seal and tentering means according to the present invention.
Figure 2:
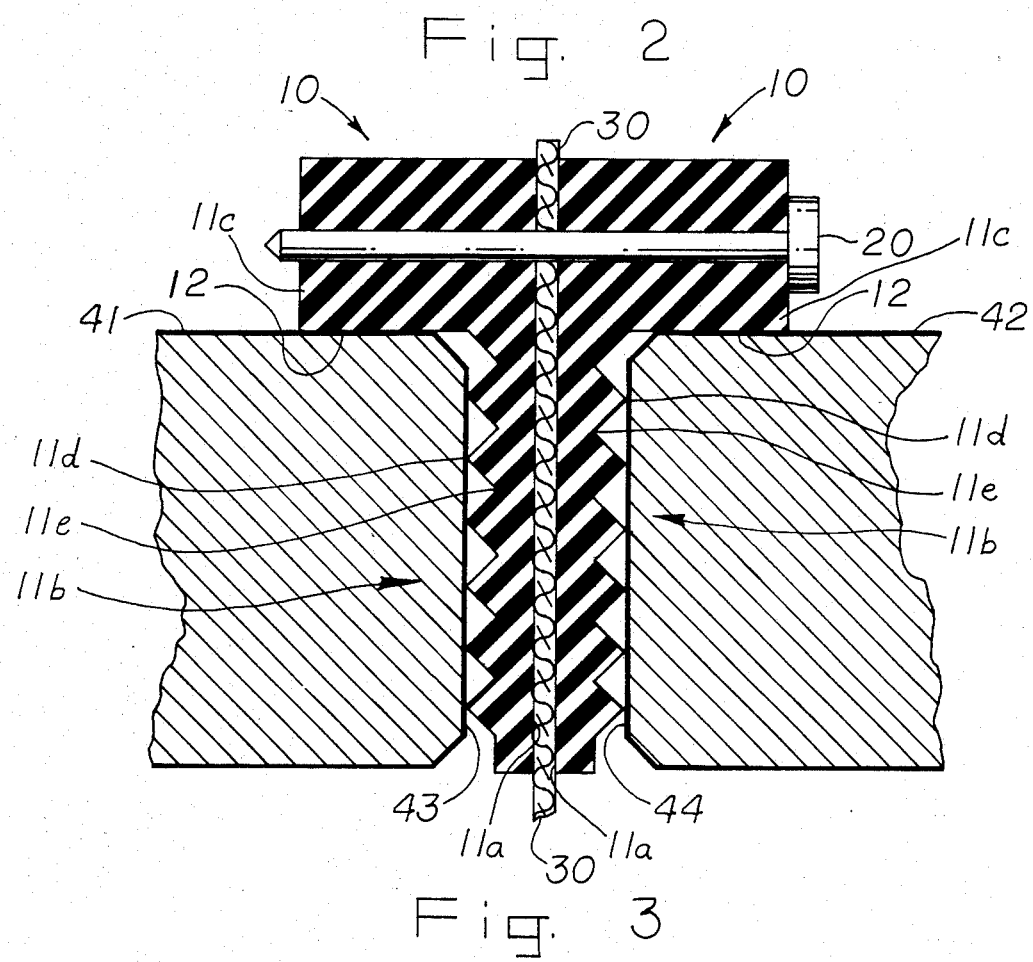
FIG. 2 is a cross-sectional view of the portion of an electrolysis cell assembly of FIG. 1 showing a combination seal and tentering means positioned between two adjacent cell frames.

With reference to FIGS. 1 and 2, there is shown a pair of seal-tentering means 10 interposed between two electrode frame members 41 and 42 with a separator 30 interposed between the pair of seal-tentering means 10. A fastener means 20 secures the pair of seal-tentering means 10 and separator 30. Alternate embodiments of the seal-tentering means 10 are shown in FIGS. 3–8, inclusive. The seal-tentering means 10 includes a substantially solid body with a first generally planar surface 11a adapted to contact a separator 30, a second uneven surface generally referred to as numeral 11b adapted to contact an electrode frame member, for example, at the frames lateral face 43 and 44 as shown in FIG. 2, and a periphery defining a shoulder portion 11c having an inside surface in contact with the outside surface of the electrode frame member forming an interface 12.

Figure 3:
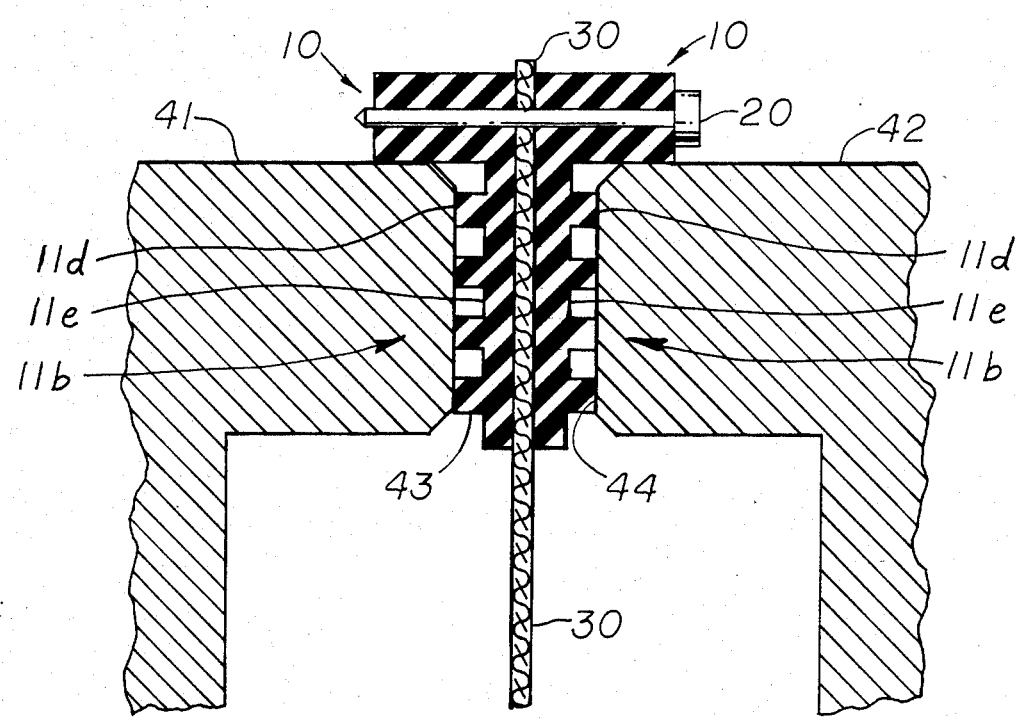
FIG. 3 is a cross-sectional view of another embodiment of the present invention showing a portion of an electrolysis cell assembly with a combination seal and tentering means.
Figure 4:
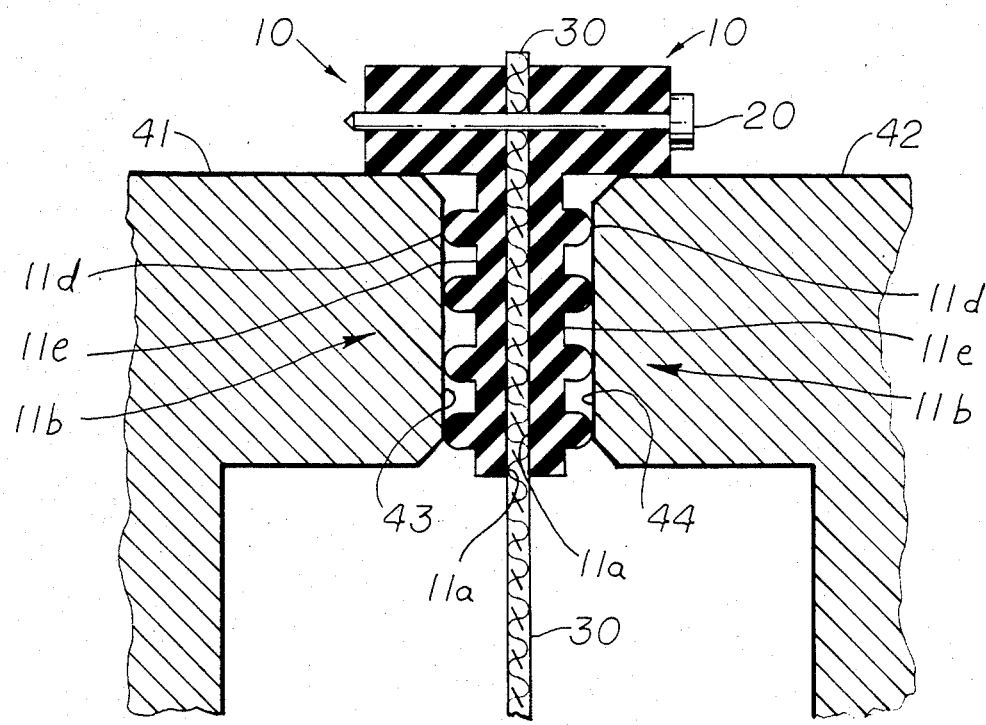
FIG. 4 is a cross-sectional view of another embodiment of the present invention showing a portion of an electrolysis cell assembly with a combination seal and tentering means.

A "substantially solid body" means the body may be porous or contain other materials embedded therein. In the present invention, the uneven surface 11b may be in the form of a series of ridges 11d and groove 11e running parallel each other on the uneven surface 11b. A cross-section view of the seal-tentering means 10 as shown in FIG. 2 shows the ridges 11d and grooves 11e to be generally triangular in shape, although any cross-sectional shape may be used. For example, the ridges 11d and grooves 11e may be of generally rectangular cross-section or of generally semi-circular cross-section as shown in FIGS. 3 and 4, respectively. Various other shapes of the ridges 11d and grooves 11e may be used if desired.

The seal-tentering means 10 may be gaskets of various materials. The selection of material for the seal-tentering means depends on the application the means will be used. For example, the gaskets may be of rubber or elastomeric materials when used in chlor-alkali cells. The gaskets should be made of material which is physically and chemically stable in contact with the electrolyte and the products of electrolysis present in a chlor-alkali cell. In the production of chlorine and caustic, for example, the gaskets must, of course, be substantially inert to acid, brine, chlorine, hydrogen and caustic. In addition, the gaskets are preferably, electrically nonconductive. Furthermore, the gaskets should be of a material having high volume resistivity and good sealability after it has been compressed. Suitably materials which can be employed in accordance with the invention include, but are not limited to, for example, Neoprene, butyl rubber, ethylene propylene diene (EPDM), chlorinated polyethylene (CPE) and a polytetrafluoroethylene (PTFE) material such as Teflon, a trademark of E. I. duPont de Nemours and Company. The durameter of these materials may range from about 40 to about 80 Shore A.

Figure 5:
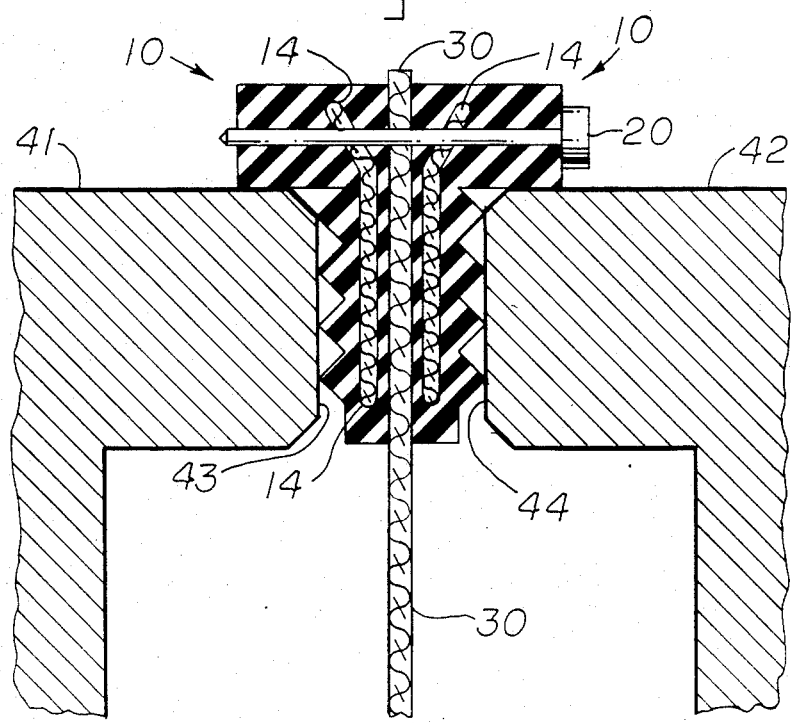
FIG. 5 is a cross-sectional view of another embodiment of the present invention showing a portion of an electrolysis cell assembly with a combination seal and tentering means.

FIG. 5 shows another preferred embodiment of the present invention wherein the seal-tentering means 10 includes a reinforcement or rigidifying material 14 embedded in the solid body. Although not shown, the rigidifying material may be used with the seal-tentering means 10 of any of the FIGS. 1–8, if desired. The purpose of the ridigifying material is to minimize local compression and stiffen quadralaterally the sealtentering means against stretch. The rigidifying material may be made of any material inert to the materials used for the seal-tentering means above, for example, the rigidifying material may be an aromatic polyamide fiber, such as Kevlar ® a trademark of E. I. duPont de Nemours & Company, polyester, nylon or fabric. The rigidifying material may also be a screen of any metallic material, for example titanium. The rigidifying material, viewed in cross-section, may be any shape or form. Preferably, a fabric material is embedded within the internals of the solid body of seal-tentering mean 10. Any of the embodiments of the present invention may include the rigidifying material.

Included within the scope of the present invention is a seal-tentering means 10 having a multilayer construction. As illustrated in FIG. 6, the seal-tentering means 10 may be constructed of a bi-layer structure. For example, a first layer 50 and a second layer 60 may be made of different or similar materials and may be of different or similar hardness. For example, the first layer 50 may be made of CPE with a hardness of 40 shore A and the second layer may be made of EPDM with a hardness of 80 shore A.

Referring again to FIGS. 1 and 2, there is shown a filter press-type electrolysis cell assembly including a separator 30 and two seal-tentering means 10 positioned between a pair of filter press-type electrode frame members 41, and 42. For illustrative purposes, frame 41 will be referred hereto as the anode frame 41 and frame 42 will be referred to as the cathode frame 42. The separator 30 is interposed between the two seal-tentering means 10 while the two seal-tentering means 10 including the separator 30 are interposed between the lateral faces 43 and 44 of frames 41 and 42 respectively. The uneven surface 11b of the seal-tentering means is in contact with the lateral face 43 and 44 of electrode frames 41 and 42, respectively, and the generally planar surface 11a of the seal-tentering means is in contact with the separator 30. The uneven surface 11b of each of the pair of seal-tentering means 10 essentially face opposite each other with the separator 30 interposed between the generally planar surfaces 11a of the seal-tentering means 10. The shoulder portion 11c of the seal-tentering means 10 is in contact with the outer surface of frames 41 and 42 to form interface 12.

A fastener means 20 such as a pin, bolt, cam, clip, tape or clamp is used to secure the two seal-tentering means and the membrane 30 together. In this embodiment a pin member 20 is used.

Figure 7:
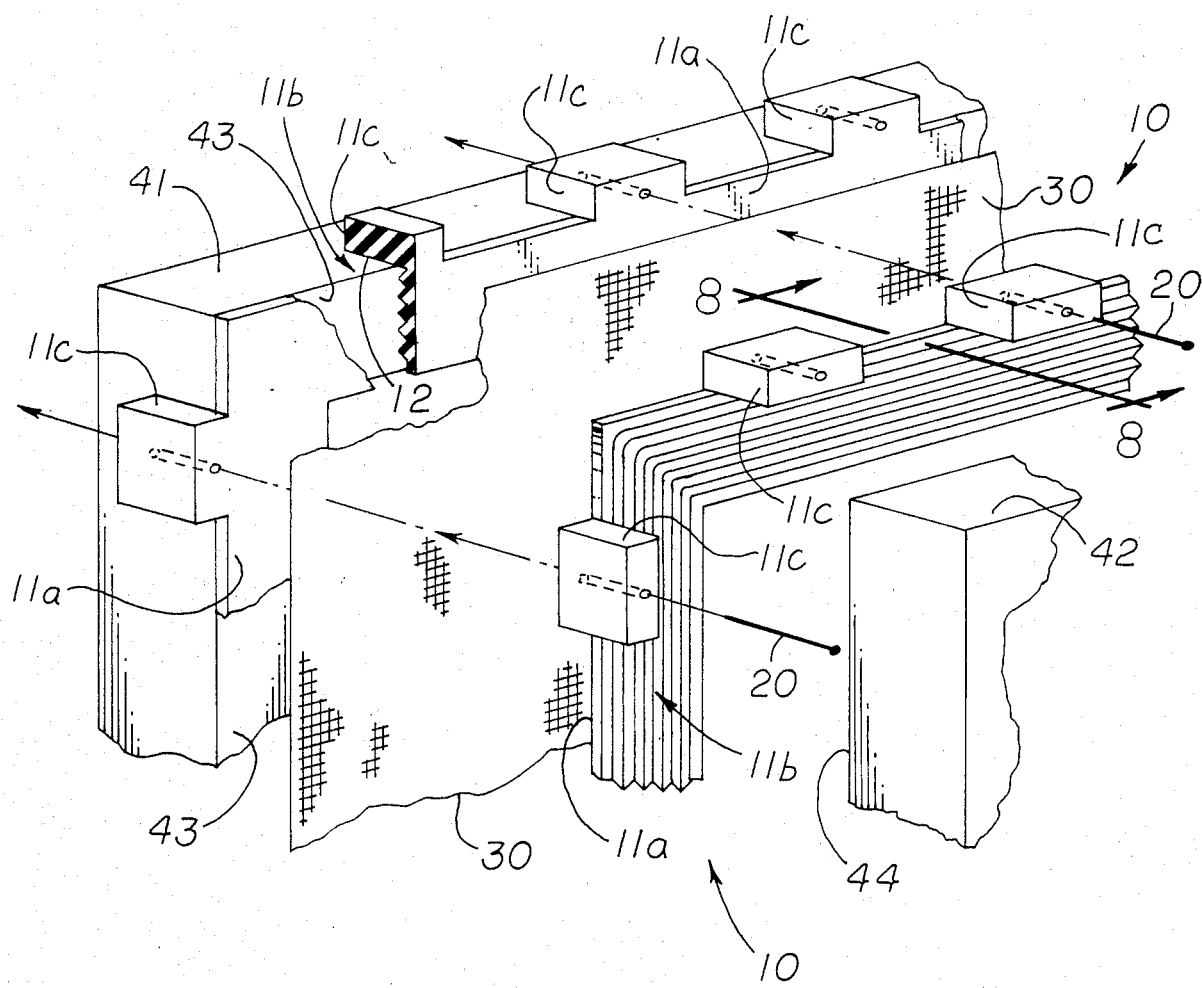
FIG. 7 is another embodiment of the present invention and illustrates a partially cut away, partially exploded, perspective view of a corner portion of an electrolysis cell assembly showing adjacent filter press-type cell frames, a membrane and a combination seal and tentering means according to the present invention.

FIGS. 7 and 8 show another embodiment of the present invention wherein the periphery defining the shoulder portion 11c of the seal-tentering means 10 is intermittently spaced apart and peripherally integral with the solid body of the seal-tentering means 10 providing the sealing aspect of the seal-tentering means contacting the frame members.

Separator 30 of the present invention may be any separator used in electrolysis cells heretofore such as diaphragms or membranes, but the instant invention is particularly applicable to ion-exchange membrane separators used in membrane, filter press-type cells. Preferably, inert, flexible separators having ion exchange properties and which are substantially impervious to the hydrodynamic flow of the electrolyte and the passage of gas products produced during electrolysis are used. Suitbly used are cation exchange membranes such as those composed of fluorocarbon polymers having a plurality of pendant sulfonic acid groups or carboxylic acid groups or mixtures of sulfonic acid groups and carboxylic acid groups. The terms "sulfonic acid groups" and "carboxylic acid groups" are meant to include salts of sulfonic acid or salts of carboxylic acid which are suitably converted to or from the acid group by processes such as hydrolysis. An example of a carboxylic acid type cation-exchange membrane is commercially available from Ashai Glass Company under the trademark Flemion ®. Another example of a suitable membrane having cation exchange properties is a perfluorosulfonic acid membrane sold commercially by E. I. duPont de Nemours and Company under the trademark Nafion ®.

The frames 41 and 42 are made of typical construction materials for electrolytic cells. The materials of construction for frames 41 and 42 may be any which are resistant to corrosion by the electrolytes and the products of electrolysis. For example, metals such as iron, steel, stainless steel, nickel, titanium, or alloys of these metals may be used. Similarly plastic materials such as polypropylene, polybutylene, polytetrafluoroethylene, fluorinated ethylene propylene (FEP) and chlorendic acid based polyesters can be employed. Liners constructed of noncorrosive material may be positioned on lateral face 43 and 44 to protect frames 41 and 42, respectively, from corrosive materials present in the electrolysis cell. For example, a liner on cell frame 41 made of metal such as titanium may be used to protect the frame structure from chlorine corrosion.

The frames 41 and 42 may be any shape used in typical electrolysis cells, for example, in the shape of rectangular bars, C or U channels, cylindrical tubes, elliptical tubes as well as being I-shaped or H-shaped. Preferably, the cross-section shape of the frame members are I-shaped.

In order to effectuate a fluid-tight, i.e. a gas and liquid-tight, seal between the adjacent frame members 41 and 42, a pair of seal-tentering means 10 is interposed between cell frames 41 and 42 so tht the ridges 11d and grooves 11e bear against the lateral face 43 and 44 of frames 41 and 42, respectively, at the points of the ridges 11d. The membrane 30 is interposed between the solid bodies of the seal-tentering means 10 wherein the opposite sides of the membrane 30 are in contact with the flat or planar surfaces 11a of the seal-tentering means 10. A compressive force, for example, using a hydraulic ram, is applied to the cell frames to compress the seal portion of the seal-tentering means with the membrane together. FIGS. 2–6 and 8 illustrate the cell assembly just prior to full compression on the frame members. Upon compression, the ridges 11d deform slightly which is not shown in any one of the Figures. The nominal compressive stress normally used to compress the seal-tentering means may range from about 50 pounds per square inch (psi) to about 2000 psi. Preferably, the nominal compressive stress on the seal-tentering means may range from about 50 psi to about 600 psi and, more preferably, from about 50 psi to about 200 psi. However, the lowest stress for effectuating a desired joint tightness is desirable for material endurance.

One advantage of the present seal-tentering assembly over conventional sealing means is that an interfacial seal may be obtained at a lower nominal compressive stress with seal-tentering means having an uneven surface than with seal means with flat surfaces. It is found that using the seal-tentering means of the present invention, there is less compressive stress on the membrane as long as the ridges of the seal-tentering means are not completely compressed. In addition it is found that the intrinsic oozing-out of the gasketing material is significantly reduced. Such features may enhance the expected service life of the membrane.

What is claimed is:

1. A combination seal and tentering means for an electrolysis cell comprising a substantially solid member having a first generally planar surface adapted to contact one side of a separator of the cell, a second uneven surface adapted to contact at least one electrode frame member of the cell, and a periphery defining a shoulder portion having an inside surface adapted to contact the outside surface of at least one electrode frame member of the cell, said solid member adapted for providing a fluid-tight seal and for tentering the separator between at least two adjacent electrode frame members.

2. The seal-tentering means of claim 1 wherein the second uneven surface is a series of ridges.

3. The seal-tentering means of claim 2 wherein the ridges are of generally triangular, rectangular or semi-circular cross-section.

4. A combination seal and tentering means for an electrolysis cell comprising a substantially solid member including rigidifying material embedded therein having a first generally planar surface adapted to contact one side of a separator of the cell, a second uneven surface defined by a series of ridges of generally triangular, rectangular or semi-circular cross-section adapted to contact at least one electrode frame member of the cell, and a periphery defining a shoulder portion having an inside surface adapted to contact the outside surface of at least one electrode frame member of the cell.

5. The seal-tentering means of claim 4 wherein the rigidifying material is a plastic, metal or fabric material.

6. The seal-tentering means fo claim 5 made of ethylene-propylene diene monomer.

7. The seal-tentering means of claim 5 made of chlorinated polyethylene.

8. A combination seal and tentering assembly for an electrolysis cell comprising (a) a first seal-tentering means adapted to contact one side of a separator and of the cell at least one electrode frame member of the cell, said first seal and tentering means comprising a substantially solid member having a first generally planar surface adapted to contact the separator, a second uneven surface adapted to contact at least one electrode frame member and a periphery defining a shoulder portion having an inside surface adapted to contact the outside surface of at least one electrode frame member, (b) a second seal-tentering means adapted to contact the other side of the separator and the other electrode frame member of the cell, said second seal-tentering means comprising a substantially solid member having a first generally planar surface adapted to contact the separator, a second uneven surface adapted to contact at least the other electrode frame member and a periphery defining a shoulder portion having an inside surface adapted to contact the outside surface of at least the other electrode frame member, and (c) a fastener means adapted to secure the first seal-tentering means and the second seal-tentering means together.

9. The assembly of claim 8 wherein the fastener means is a plurality of pins.

10. The assembly of claim 9 wherein the uneven surface of the seal-tentering means is a series of ridges.

11. The assembly of claim 10 wherein the ridges of the seal-tentering means are generally triangular, rectangular or semicircular cross-section.

12. The assembly of claim 11 wherein the seal-tentering means includes a rigidifying material embedded therein.

13. The assembly of claim 12 wherein the rigidifying material is a plastic, metal or fabric material.

14. The cell assembly of claim 13 wherein the seal-tentering means is made of ethylene-propylene diene monomer.

15. The assembly of claim 13 wherein the seal-tentering means is made of chlorinated polyethylene.

16. The assembly of claim 8 wherein the separator is a membrane.

17. An electrolysis cell assembly comprising
(a) an anode frame,
(b) a cathode frame,
(c) a separator interposed between the anode and cathode frame,
(d) a firt seal-tentering means interposed between one side of the separator and the anode frame, said first seal-tentering means comprising a substantially solid member having a first generally planar surface in contact with the separator, a second uneven surface in contact with the anode frame and a periphery defining a shoulder portion having an inside surface in contact with the outside surface of the anode frame, said solid member adapted for providing a fluid-tight seal and for tentering the separator between at least two adjacent electrode frame members.
(e) a second seal-tentering means interposed between the other side of the separator and the cathode frame, said second seal-tentering means comprising a substantially solid member having a first generally planar surface in contact with the separator, a second uneven surface in contact with the cathode frame and a periphery defining a shoulder portion having an inside surface in contact with the outside surface of the cathode frame, said solid member adapted for providing a fluid-tight seal and for tentering the separator between at least two adjacent electrode frame members.

18. The cell assembly of claim 17 wherein the separator is a membrane.

19. An electrolysis cell assembly comprising
(a) an anode frame,
(b) a cathode frame,
(c) a separator interposed between the anode and cathode frame,
(d) a first seal-tentering means interposed between one side of the separator and the anode frame, said first seal-tentering means comprising a substantially solid member having a first generally planar surface in contact with the separator, a second uneven surface in contact with the anode frame and a periphery defining a shoulder portion having an inside surface in contact with the outside surface of the anode frame,
(e) a second seal-tentering means interposed between the other side of the separator and the cathode frame, said second seal-tentering means comprising a substantially solid member having a first generally planar surface in contact with the separator, a second uneven surface in contact with the cathode frame and a periphery defining a shoulder portion having an inside surface in contact with the outside surface of the cathode frame, and
(f) a fastener means adapted to secure the first seal-tentering means, the second seal-tentering means and separator together.

20. The cell assembly of claim 19 wherein the fastener means is a plurality of pins.

21. The cell assembly of claim 20 wherein the uneven surface of the seal-tentering means is a series of ridges.

22. The cell assembly of claim 21 wherein the ridges of the seal-tentering means are generally triangular, rectangular or semicircular cross-section.

23. The cell assembly of claim 22 wherein the seal-tentering means includes a rigidifying material embedded therein.

24. The cell assembly of claim 23 wherein the rigidifying material is a plastic, metal or fabric material.

25. The cell assembly of claim 24 wherein the seal-tentering means is made of ethylene-propylene diene monomer.

26. The cell assembly of claim 24 wherein the seal-tentering means is made of chlorinated polyethylene.

27. The cell assembly of claim 19 wherein the separator is a membrane.

28. A method for sealing an electrolysis cell in combination with tentering the separator of said cell comprising
(a) interposing a separator between an anode and a cathode frame of an electrolysis cell,
(b) interposing a first seal-tentering means between one side of the separator and the anode frame, said first seal-tentering means comprising a substantially solid member having a first generally planar surface in contact with the separator, a second uneven surface in contact with the anode frame and a periphery defining a shoulder portion having an inside surface in contact with the outside surface of the anode frame, said solid member adapted for providing a fluid-tight seal and for tentering the separator between at least two adjacent electrode frame members, (c) interposing a second seal-tentering means between the other side of the separator and the cathode frame, said second seal-tentering means comprising a substantially solid member having a first generally planar surface in contact with the separator, and a second uneven surface in contact with the cathode frame and a periphery defining a shoulder portion having an inside surface in contact with the outside surface of the anode frame, said solid member adapted for providing a fluid-tight seal and for tentering the separator between at least two adjacent electrode frame members, and (d) applying a compressive force to the frames.

29. The method of claim 28 wherein the separator is a membrane.

30. A method comprising
(a) interposing a membrane between an anode and a cathode frame of an electrolysis cell,
(b) interposing a first seal-tentering means between one side of the membrane and the anode frame, said first seal-tentering means comprising a substantially solid member having a first generally planar surface in contact with the separator, a second uneven surface in contact with the anode frame and a periphery defining a shoulder portion having an inside surface in contact with the outside surface of the anode frame,
(c) interposing a second seal-tentering means between the other side of the membrane and the cathode frame, said second seal-tentering means comprising a substantially solid member having a first generally planar surface in contact with the membrane, and a second uneven surface in contact with the cathode frame and a periphery defining a shoulder portion having an inside surface in contact with the outside surface of the anode frame,
(d) securing the first seal-tentering means, the second seal-tentering means and the membrane together, and
(e) applying a compressive force to the frames.

31. The method of claim 30 wherein the first and second seal-tentering means and the membrane is secured with a plurality of fastening means.

32. The method of claim 31 wherein the fastening means are pins.

33. The method of claim 32 wherein the uneven surface of the seal-tentering means is a series of ridges.

34. The method of claim 33 wherein the ridges of the seal-tentering means are generally triangular, rectangular or semicircular cross-section.

35. The method of claim 34 wherein the seal-tentering means includes a rigidifying material embedded therein.

36. The method of claim 35 wherein the rigidifying material is a plastic, metal or fabric material.

37. The method of claim 36 wherein the seal-tentering means is made of ethylene-propylene diene monomer.

38. The method of claim 37 wherein the seal-tentering means is made of chlorinated polyethylene.

* * * * *